March 18, 1958 G. W. RATHENAU 2,827,437
METHOD OF MAKING A PERMANENT MAGNET
Filed Oct. 1, 1952
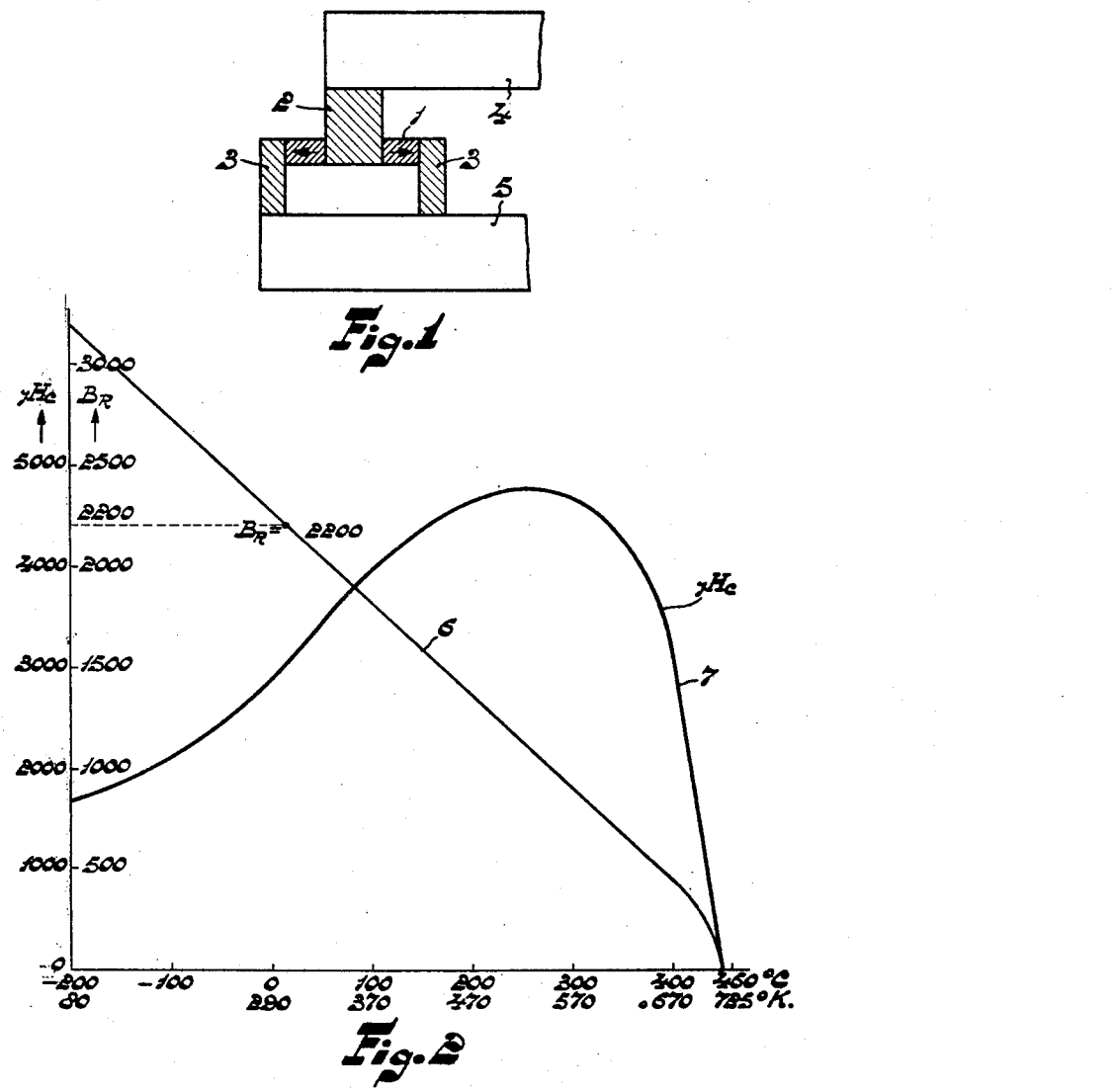
INVENTOR
GERHART WOLFGANG RATHENAU
BY
AGENT United States Patent Office 2,827,437
Patented Mar. 18, 1958

2,827,437

METHOD OF MAKING A PERMANENT MAGNET

Gerhart Wolfgang Rathenau, Eindhoven, Netherlands, assignor, by mesne assignments, to North American Philips Company, Inc., New York, N. Y., a corporation of Delaware Application October 1, 1952, Serial No. 312,576

Claims priority, application Netherlands October 4, 1951

3 Claims. (Cl. 252—62.5)

This invention relates to a method of making a permanent magnet.

Heretofore, in the manufacture of isotropic magnets, it has been necessary to magnetize the material at room temperature in a magnetic field having an intensity which is about 4 to 5 times higher than the B-coercive force $_BH_C$ of the material to obtain a permanent magnet which is magnetized to saturation. Such a technique has many disadvantages, for example, huge magnetic fields are required which, in many cases, are presently unobtainable.

The main object of the invention is to provide a method for completely magnetizing permanent magnets employing a magnetic field having smaller magnetic values as those ultimately obtained in the permanent magnet.

According to the method of the invention, the permanent magnet body is completely magnetized at a temperature which substantially differs from room temperature in a magnetic field weaker than that ultimately obtained at room temperature from the permanent magnet if this magnet had been magnetized to saturation at room temperature. The field obtained at room temperature from the isotropic magnet magnetized according to the method of the invention is substantially equal to the field obtained from the magnet if it had been magnetized to saturation at room temperature.

According to a further aspect of the invention, the intensity of the magnetizing field employed to magnetize the permanent magnet body is not more than the I-coercive force $_IH_C$ of the material of the magnet at room temperature, and, preferably, is not more than 700 oersted. Consequently, it is now possible to fully magnetize a permanent magnet employing another permanent magnet of the same strength.

In a preferred embodiment of the method of the invention, the permanent magnet body is heated to a temperature at least between the temperature of the Curie-point in degrees Kelvin and 0.80 times that temperature. Then, the permanent magnet body is placed in a magnetic field and magnetized, the field removed and the body cooled to room temperature. Alternatively, the body may be cooled to room temperature while maintaining the magnetizing field. Or, as a further alternative, the field may be applied to the body only at a particular temperature or range of temperatures while it is being cooled. It has been found that the remanence $B_r$ obtained by the method according to the invention employing a weak magnetizing field is greater than that obtainable by magnetizing at room temperature with the same weak field, particularly if the I-coercive force $_IH_C$ of the material at high temperatures is considerably higher than the $_IH_C$ at room temperature.

According to a modification of the above-described technique, the permanent magnet body is first heated to a temperature above the Curie point, the temperature reduced to the desired temperature at which the magnetic field is applied, and the field applied to magnetize the body.

According to a further embodiment of the method of the invention, the permanent magnet body is cooled to a temperature less than —50° C., preferably about the temperature of liquid air and, then, the magnetic field is applied to magnetize the body.

The method according to the invention is particularly suitable for ferromagnetic materials which, in the temperature range between the Curie point temperature and a temperature below room temperature exhibit a $_IH_C$ characteristic having a rapidly ascending branch, a maximum and, in some cases, a descending branch. Examples of such materials are cobalt ferrous ferrite, but preferably materials which are fully described in U. S. patent application, Serial No. 239,264, filed July 30, 1951, and now U. S. Patent 2,762,778, which materials are characterized by a composition substantially consisting of non-cubic crystals consisting principally of a polyoxide of iron, an oxide of at least one of the metals barium, strontium and lead, and, if desired, a small amount of calcium. Among these materials, those best suited for the method of the invention are the materials constituted by single and/or mixed crystals having the structure of magnetoplumbite of the composition $MO.6Fe_2O_3$, where M represents one of the metals Ba, Sr and Pb.

The invention will now be described with reference to the accompanying drawing in which:

Fig. 1 is a view, in cross-section, of an annular permanent magnet being magnetized; and Fig. 2 shows curves of remanence $B_r$ and I-coercive force $_IH_C$ with temperature for one of the materials described in U. S. application, Serial No. 239,264.

Referring to Fig. 1, an annular permanent magnetic body 1 is to be magnetized in the direction of the arrows and thus radially in all directions so that the cylindrical inner surface of the ring-like body 1 forms one pole and the outer wall constitutes the other pole. The body is made from $BaO.6Fe_2O_3$. This material has, for example, a B-coercive force $_BH_C$ of about 1,600 oersted and a remanence $B_r$ of about 2,200 gauss. The $_IH_C$-value is about 3,000 oersted. The inner wall of the ring 1 is provided with a cylindrical pole shoe 2 and the outer wall with an annular pole shoe 3, the pole shoes bearing against the poles 4 and 5 of a magnetizing device (shown diagrammatically).

For purposes of comparison, the known methods of magnetization will be compared with the method according to the invention. With the known method the magnetic body 1 is to be magnetized per cm.$^2$ outer surface area by means of a field having an intensity which is 4 or 5 times the $_BH_C$-value, in this case, about $4 \times 1,600 = 6,400$ oersted. If the outer diameter of the body is 5 cms. and the height is 1 cm., the surface area of the outer cylinder wall is $\pi D.1 = 3.14 \times 5 \times 1 = 15.7$ cm.$^2$. Thus, the total induction in the central stud 2 to produce saturation magnetization in the body 1 would be $15.7 \times 6,400 = 100,480$ gauss. If the diameter of the stud is 1.8 cm., the surface area of the cross-section of the stud is about 2.5 cm.$^2$ so that an induction of $$\frac{100,480}{2.5} = \text{about } 40,000 \text{ gauss}$$

would be required to be sent through the stud section 2 to completely magnetize the body 1. This, however, is impossible because the best material obtainable for the stud, for example Co-iron, is already saturated at an induction of 24,000 gauss. Consequently, the annular permanent magnetic body 1 could not be magnetized with the known method up to the saturation point of the magnetizing curve. However, the same annular body 1 could be magnetized to saturation by the method of the invention because a much smaller field, about 5 to 15 times smaller, is required, as will now be illustrated by the following examples.

A bar-shaped body made from the above-mentioned material ($BaO.6Fe_2O_3$) was magnetized in the direction of its length at room temperature by the known method in a field of 8,000 oersted. The resultant magnet exhibited a remanence value of $B_r$ of 2,200 gauss. The working point of this magnet was situated on the demagnetizing curve on a point corresponding to a counter field $H=-17$ oersted, i. e. at a point corresponding in practice to the remanence $B_r$. After demagnetization of the magnet by heating above the Curie-point (about 450° C.) but not higher than 500° C., a field of 500 oersted, about 1/16 of the field required at room temperature, was applied, the magnet cooled to 400° C., and the field removed in accordance with the invention. After cooling to room temperature, $B_r$ was found to be again approximately equal to 2,200 gauss and it was also found that maintaining the field while the material cooled to room temperature was not required. In this case, the coercive force $_BH_C$ was found to be identical with the $_BH_C$ value obtained when magnetizing at room temperature in a field of 8,000 oersted with the known method.

Referring to Fig. 2, the curve 6 shows the variation of $B_r$ at the various temperatures of the material $BaO.6Fe_2O_3$. At room temperature (about 20° C.) $B_r$ has a value of 2,200 gauss, increasing at lower temperatures up to the temperature of liquid air (about −200° C.). The curve 7 shows the variation of the $_IH_C$-value at various temperatures of the same material and exhibits at high temperatures a rapidly ascending branch, at about 250° C. a maximum of about 5,000 oersted and then a descending branch having at room temperature a value of more than 3,000 oersted and at −200° C. still a value of 1,700 oersted. If a high value of $_IH_C$ is desired, it is advantageous to house the magnet in a device where a temperature of, for example, 250° C. prevails so that the working point of the magnet is situated at the maximum of the $_IH_C$-curve.

A further bar-shaped magnet of similar composition exhibited a B of 2,070 gauss after magnetization in a field of 8,000 oersted at room temperature with the known method. After magnetization in a field of 500 oersted in the temperature range from 500 to 400° C. in accordance with the invention, the said bar had a B of 2,030 gauss at room temperature.

A further permanent magnetic body shaped in the form of a very flat ring and designed for a loudspeaker was also magnetized by the method according to the invention. The external diameter of the ring was 82 mms., the internal diameter 41 mms. and the height 12 mms. Due to the very low length of the magnet, the magnet was at a point of the demagnetizing curve at which the value of the counter field H was about 1,300 oersted. After magnetization in a known manner at room temperature in a field of 11,000 oersted a value $B=320$ gauss was obtained. After magnetization in a field of 500 oersted in the temperature range between 500° and 400° C. according to the invention, the values of B were found, after cooling to room temperature, to vary between 318 and 322 gauss. In the case of magnetization in a field of 500 oersted at room temperature in a known manner, a B value of about 18 gauss was obtained thereby pointing out the advantages of the invention.

The bar-shaped magnet described above was magnetized at room temperature in a field of 500 oersted in a known manner and the B value resulting therefrom was 298 gauss. The bar was then demagnetized by heating beyond the Curie-point and magnetized at the temperature of liquid air (about −200° C.) in a field of 500 oersted in accordance with the invention. After the magnet had re-assumed room temperature in this field, a B of 620 gauss was measured, more than double the 298 gauss obtained by the conventional method.

While I have thus described my invention with specific examples and embodiments thereof, other modifications will be readily apparent to those skilled in the art without departing from the spirit and the scope of the invention as defined in the appended claims.

What I claim is:

1. A method of magnetizing a permanent magnet body consisting essentially of a highly-coherent compact mass of hexagonal crystals selected from the group consisting of $MFe_{12}O_{19}$ and $MFe_{18}O_{27}$ in which M is at least one metal selected from the group consisting of barium, strontium, and lead and calcium in an atomic fraction up to 0.4 of said metal, comprising the steps, bringing said body to a temperature substantially different than room temperature but below the Curie point of said body, subjecting said body while at said temperature to a magnetizing field having an intensity less than about 700 oersted, and bringing said magnetically saturated body to room temperature without further magnetizing said body.

2. A method of magnetizing a permanent magnet body consisting essentially of a highly-coherent compact mass of hexagonal crystals selected from the group consisting of $MFe_{12}O_{19}$ and $MFe_{18}O_{27}$ in which M is at least one metal selected from the group consisting of barium, strontium, and lead and calcium in an atomic fraction up to 0.4 of said metal, comprising the steps, heating said body to a temperature between about 400 and 500° C., subjecting said body while at said temperature to a magnetizing field having an intensity less than about 700 oersted, and bringing said magnetically saturated body to room temperature without further magnetizing said body.

3. A method of magnetizing a permanent magnet body consisting essentially of a highly-coherent compact mass of hexagonal crystals selected from the group consisting of $MFe_{12}O_{19}$ and $MFe_{18}O_{27}$ in which M is at least one metal selected from the group consisting of barium, strontium, and lead and calcium in an atomic fraction up to 0.4 of said metal, comprising the steps, cooling said body to a temperature of less than about −50° C., subjecting said body while at said temperature to a magnetizing field having an intensity less than about 700 oersted, and bringing said magnetically saturated body to room temperature without further magnetizing said body.

References Cited in the file of this patent

UNITED STATES PATENTS

| 1,976,230 | Kato et al. | Oct. 9, 1934 |
| 2,293,240 | Brauburger | Aug. 18, 1942 |
| 2,295,082 | Jonas | Sept. 8, 1942 |

FOREIGN PATENTS

| 441,714 | Great Britain | Jan. 24, 1936 |

OTHER REFERENCES

"Ferromagnetism," Bozorth, page 421. D. Van Nostrand Co., Inc., New York. Received at Patent Office September 18, 1951.